United States Patent
Yi et al.

(10) Patent No.: US 8,832,338 B2
(45) Date of Patent: Sep. 9, 2014

(54) MECHANISM FOR FACILITATING DYNAMIC TIMESTAMP-LESS CLOCK GENERATION FOR TRANSMITTING MEDIA STREAMS OVER SHARED CHANNELS

(71) Applicant: Silicon Image, Inc., Sunnyvale, CA (US)

(72) Inventors: Ju Hwan Yi, Sunnyvale, CA (US); Young Il Kim, Sunnyvale, CA (US); Young Don Bae, Sunnyvale, CA (US)

(73) Assignee: Silicon Image, Inc., Sunnyvale, CA (US)

(*) Notice: Subject to any disclaimer, the term of this patent is extended or adjusted under 35 U.S.C. 154(b) by 0 days.

(21) Appl. No.: 13/736,765

(22) Filed: Jan. 8, 2013

(65) Prior Publication Data
US 2014/0192264 A1 Jul. 10, 2014

(51) Int. Cl.
*G06F 3/00* (2006.01)
*G06F 13/00* (2006.01)

(52) U.S. Cl.
USPC ............. 710/60; 710/2; 710/5; 710/8; 710/15

(58) Field of Classification Search
None
See application file for complete search history.

(56) References Cited

U.S. PATENT DOCUMENTS

| | | | |
|---|---|---|---|
| 7,764,717 B1 | 7/2010 | Yu et al. | |
| 2005/0100054 A1 | 5/2005 | Scott et al. | |
| 2006/0133398 A1 | 6/2006 | Choi et al. | |
| 2007/0242678 A1 | 10/2007 | Fu et al. | |
| 2011/0110642 A1* | 5/2011 | Salomons et al. | 386/202 |
| 2011/0208329 A1* | 8/2011 | Castor-Perry | 700/94 |
| 2012/0323651 A1* | 12/2012 | Fernandez | 705/14.4 |

FOREIGN PATENT DOCUMENTS

JP 09-270831 A 10/1997

OTHER PUBLICATIONS

PCT International Search Report and Written Opinion, PCT Application No. PCT/US2013/070803, Feb. 26, 2014, 8 pages.

* cited by examiner

*Primary Examiner* — Scott Sun
(74) *Attorney, Agent, or Firm* — Fenwick & West LLP

(57) ABSTRACT

A mechanism for facilitating dynamic timestamp-less clock generation for transmitting media streams over shared channels is described. In one embodiment, a method includes periodically counting and producing, at a first media device, a number of audio/video ("A/V") samples, generating a pace clock based on the number of A/V samples, generating a target clock based on the pace clock, and transmitting an A/V media stream based on a frequency difference between a pace frequency relating to the pace clock and a target frequency relating to the target clock.

20 Claims, 7 Drawing Sheets

MECHANISM FOR FACILITATING DYNAMIC TIMESTAMP-LESS CLOCK GENERATION FOR TRANSMITTING MEDIA STREAMS OVER SHARED CHANNELS

TECHNICAL FIELD

Embodiments of the invention generally relate to media communication and, more particularly, to a mechanism for facilitating dynamic timestamp-less clock generation for transmitting media streams over shared channels.

BACKGROUND

With increasing digitization of electronic devices, there remains a need for more accurate, efficient, and cost-effective audio/video ("A/V") clock regeneration. Conventional A/V clock regeneration systems are timestamp-based, inefficient, costly, and severely problematic, particularly when applied to multiple source/sink systems where multiple source/sink devices share the limited channel bandwidth. For example, conventional A/V clock regeneration systems are required to maintain an exact timestamp interval, which becomes problematic in a shared channel environment where transmitting data within a specific time may not be so simple, such as where one source device needs to send timestamp data over a channel, while the channel is occupied by another source device.

SUMMARY

A mechanism for facilitating dynamic timestamp-less clock generation for transmitting media streams over shared channels is described.

In one embodiment, a method includes periodically counting and producing, at a first media device, a number of audio/video ("A/V") samples, generating a pace clock based on the number of A/V samples, generating a target clock based on the pace clock, and transmitting an A/V media stream based on a frequency difference between a pace frequency relating to the pace clock and a target frequency relating to the target clock.

In another embodiment, an apparatus performs a method according to any one or more of the operations mentioned above.

In another embodiment, a system includes one or more devices performing a method according to any one or more of the operations mentioned above.

In yet another embodiment, at least one machine-readable medium comprising a plurality of instructions that in response to being executed on a computing device, causes the computing device to carry out a method according to any one or more of the operations mentioned above.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are directed to facilitating dynamic timestamp-less clock generation for transmitting media streams over shared channels.

Figure 1:
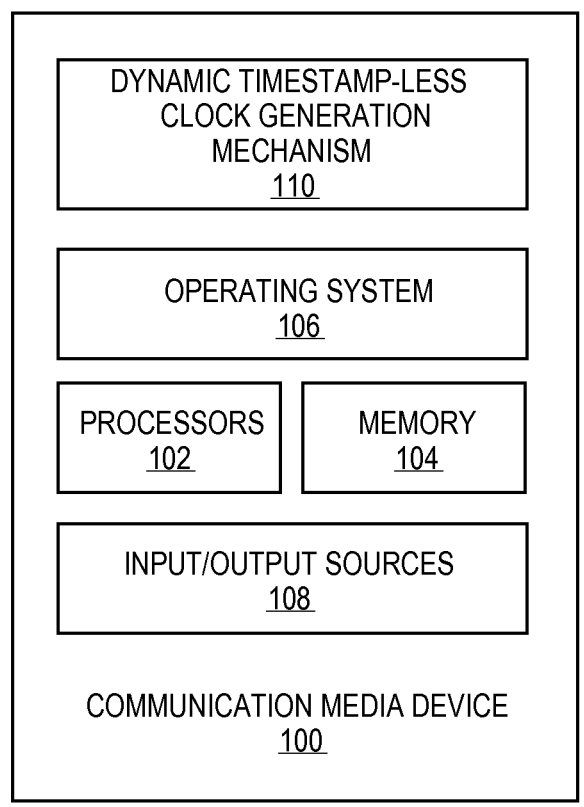
FIG. 1 illustrates a media device employing a dynamic timestamp-less clock generation mechanism according to one embodiment.

FIG. 1 illustrates a media device employing a dynamic timestamp-less clock generation mechanism 110 according to one embodiment. Communication or network media device 100 may include any number and type of media devices, such as a source device (e.g., a transmitter), a sink device (e.g., a receiver), an intermediate device (e.g., an independent clock generator), etc. Communication media device 100 may include any number of components and/or modules that may be common to a variety of media devices (such as a sink device, a source device, etc.); however, throughout this document and particularly with reference to FIG. 2, in one embodiment and for brevity, clarity and ease of understanding, communication media device 100 may include and be referred to as a host device or host machine employing dynamic timestamp-less clock generation mechanism ("clock generation mechanism") 110 and set to be in communication with any number and type of devices, such as one or more source devices and/or sink device and/or intermediate devices over a network (e.g., a broadcasting network, such a cable or satellite broadcasting network, a Wide Area Network (WAN), a Local Area Network (LAN), a Personal Area Network (PAN), a Metropolitan Area Network (MAN), a cloud-based network, an intranet, the Internet, a cloud-based network, etc., and a shared-channel network including a High-Definition Multimedia Interface (HDMI), a Mobile High-Definition Link (MHL), a DisplayPort, a Universal Serial Bus (USB), a Peripheral Component Interconnect (PCI), and an on-chip bus including Advanced Microcontroller Bus Architecture (AMBA), etc.

A source device refers to a transmitter or a transmitting device that is responsible for transmitting data (e.g., media audio and/or video data/content streams) to a sink device that refers to a receiver or a receiving device responsible for receiving the transmitted data over a communication network. Examples of a source device may include consumer electronics devices, such as a personal computer ("PC"), a mobile computing device (e.g., a tablet computer, a smartphone, etc.), an MP3 player, an audio equipment, a television, a radio, a Global Positioning System ("GPS") or navigation device, a digital camera, an audio/video recorder, a Blu-Ray player, a Digital Versatile Disk ("DVD") player, a Compact Disk ("CD") player, a Video Cassette Recorder ("VCR"), a camcorder, a docking station, a cable adapter, and a dongle, etc. Examples of a source device may further include a computing device, a data terminal, a machine (e.g., a facsimile machine, a telephone, etc.), a video camera, a broadcasting station (e.g., a television or radio station, a cable headend, etc.), a cable broadcasting head-end, a set-top box, a satellite, etc. A sink device may include one or more of the same examples of media devices as those listed for the source device. Similarly, an intermediate device may include one or more of the same media device as those listed for the source device or it may include a specialized clock generator to perform timestamp-less clock generation in one or more embodiments.

Communication media device 100 may include an operating system 106 serving as an interface between any hardware or physical resources of the source device 100 and a sink device or a user. Communication media device 100 may further include one or more processors 102, memory devices 104, network devices, drivers, or the like, as well as input/output ("I/O") sources 108, such as a touchscreen, a touch panel, a touch pad, a virtual or regular keyboard, a virtual or regular mouse, etc.

Embodiments provide clock generation mechanism 110 to facilitate extracting source clock timestamp at a sink device by counting the number of received audio/video samples allowing for clock generation without having the need for generating or delivering timestamp or any clock-related information over a channel, and allowing the channel system to be without a common channel clock for regenerating a target clock. Clock generation mechanism 110 further provides for a digital feedback loop for low resolution phased-lock loop or phase lock loop (PLL) by using an interim clock reference to increase clock frequency and reduce clock jitter of the regenerated clock as well as to reduce hardware cost and complexity for implementing high resolution PLL.

Figure 2A:
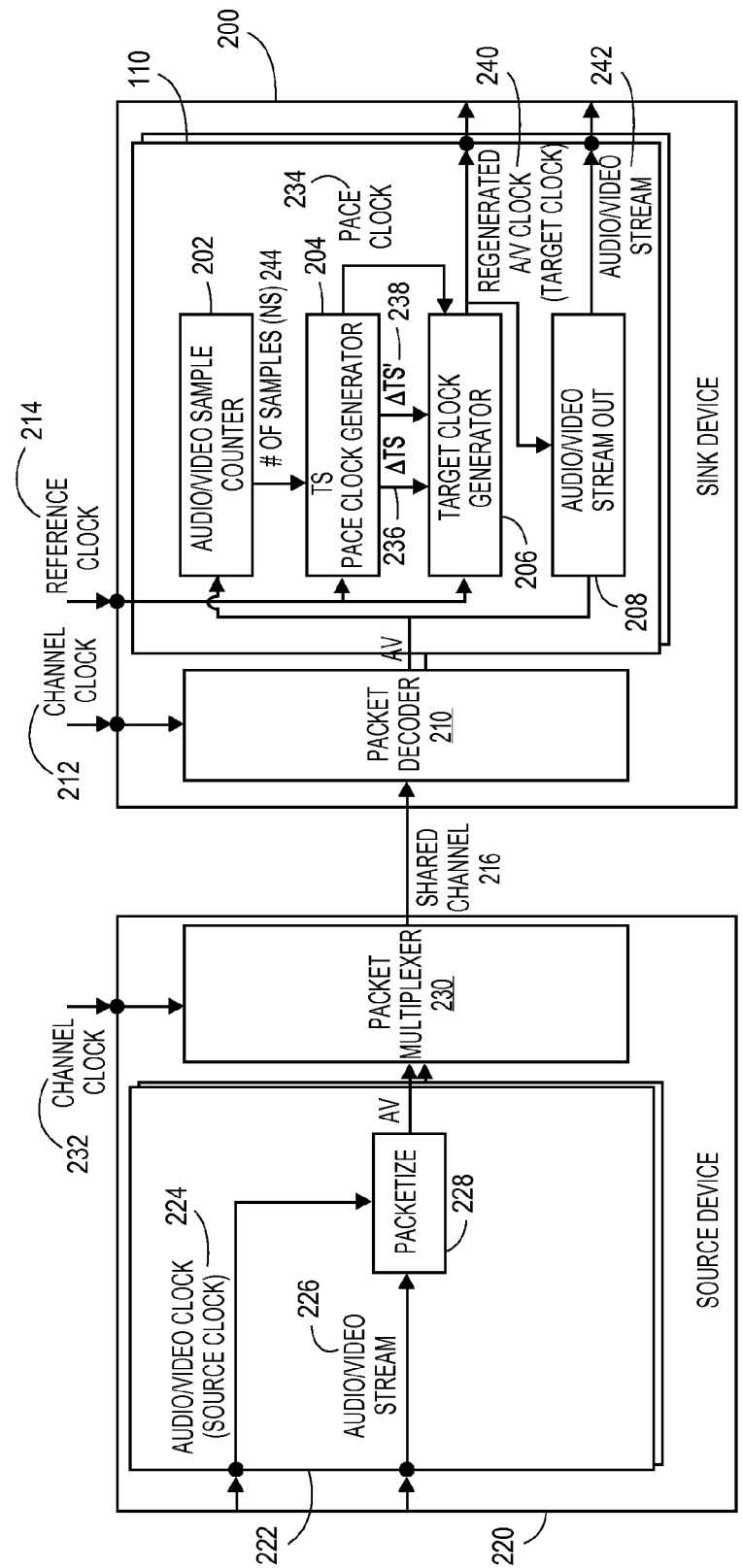
FIG. 2A illustrates dynamic timestamp-less clock generation mechanism according to one embodiment.

FIG. 2A illustrates dynamic timestamp-less clock generation mechanism 110 according to one embodiment. In one embodiment, clock generation mechanism 110 includes a number of components, such as audio/video ("A/V") sample counter ("counter") 202, place clock generator 204, target clock generator 206, and A/V stream out logic 208. It is contemplated that clock generation mechanism 110 may not be limited only to the component illustrated here and it may contain additional default components or new components, such as for communication logic for communication purposes, compatibility logic to provide compatibility, etc., for performing additional functions. Similarly, one or more of the existing components may be removed or changed as necessitated or desired. Furthermore, as will be further illustrated, the illustrated components may include sub-components, such as pace clock generator 204 may contain module accumulator 230, etc. Throughout this document, various components of clock generation mechanism 110 may be interchangeably referred to as "logic", "processing logic", or "module" and may include, by way of example, software, hardware, and/or any combination of software and hardware, such as firmware.

In one embodiment, using clock generation mechanism 110, source device 220 does not have to transmit any information for regenerating A/V clock. Additionally, source and sink devices 220, 200 may not have a common channel clock for A/V clock regeneration, such as source device 220 and sink device 200 may have two independent channel clocks 232, 212, respectively, with similar frequency for channel data transmission.

Source device 220 may receive an audio/video clock 224 and an audio/video media stream 226 to be packetized 228 and provided to packet multiplexer 230 that then receives a clock from the source device-based channel clock 232. On the side of sink device 200, packet decoder or de-multiplexer 210 decodes the audio/video packet received from source device 220 where channel clock 212 is assigned.

In one embodiment, counter 202 may determine values of number of samples ("NS") 244 by counting the number of audio/video samples received at sink device 200 from source device 220 via shared channel 216, packet multiplexer 230 at source device 220 and packet de-multiplexer or decoder 210 at sink device 200. The NS values 244 are then provided to pace clock generator 204 where they may be used, at a later point in time, as timestamp 236, 238 ($\Delta$TS, $\Delta$TS') at pace clock generator 204, because source device 220 may produce an audio/video sample for each audio/video clock cycle at sink device 200. Pace clock generator 204 generates and provides a pace clock 234 along with forwarding on timestamp ($\Delta$TS) 236 and timestamp-prime ($\Delta$TS') 238 to target clock generator 206. Further, sink device 200 may find out the number of audio/video clock cycles it takes, at this point, by counting, via counter 202, the number of audio/video samples that are received. Target clock generator 206 provides a regenerated A/V clock (also referred to as "target clock") 240 that is forwarded on to A/V media stream out logic 208 that used the target clock 240 to transmit the A/V media stream 242 for user to view and/or listen via a display device coupled to sink device 200.

Figure 2B:
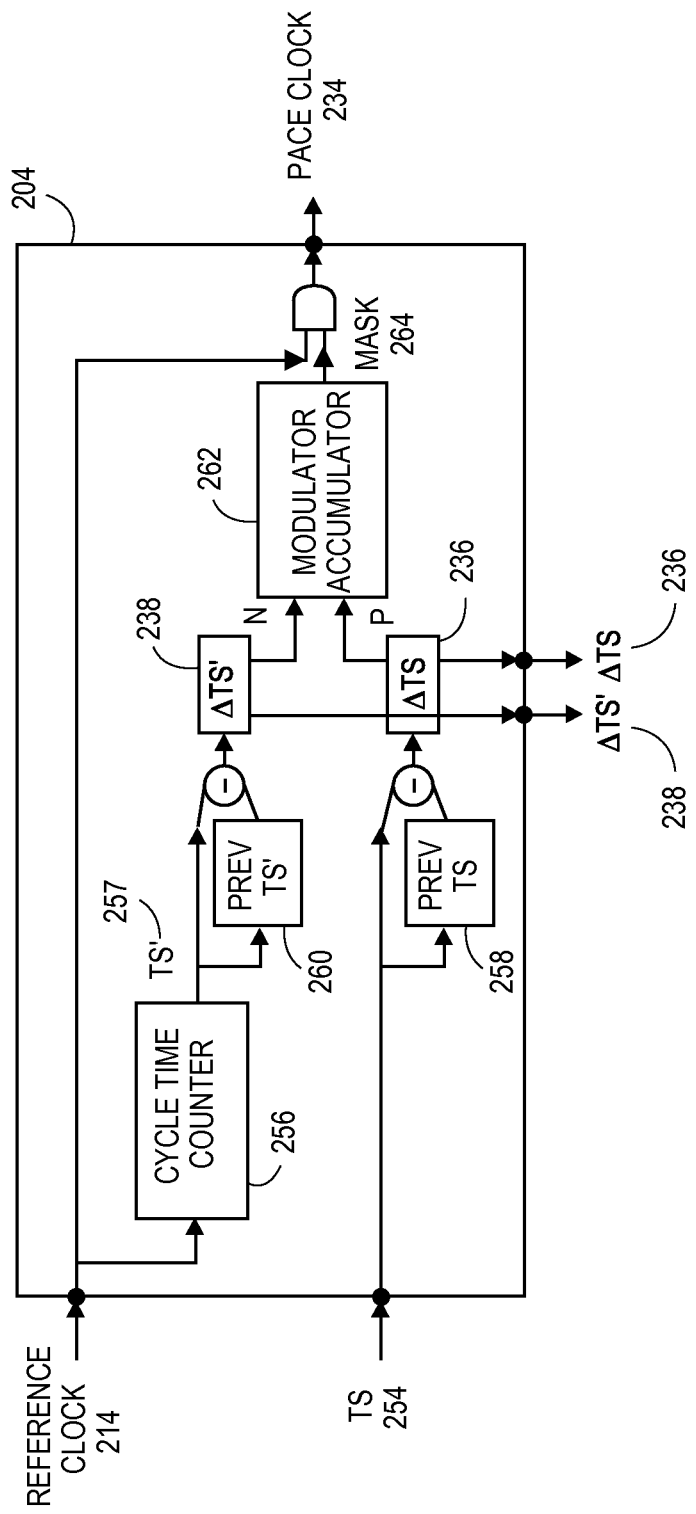
FIG. 2B illustrates a pace clock generator according to one embodiment.

Referring now to FIG. 2B, it illustrates pace clock generator 204 which generates pace clock 234 representing a digitally-controlled signal that has the same frequency as source audio/video clock 224. Further, pace clock generator 204 generates pace clock 234 out of a local reference clock 214 by determining the fractional relationship between source audio/video clock 224 and the local reference clock 214. Pace clock generator 204 further takes timestamp 254 from the audio/video sample counter 244 and reference clock 214 as inputs. Reference clock 214 has any frequency faster than a source audio/video clock range and with this reference clock 214, pace clock generator 204 generates another timestamp (TS') 257 by counting the number of reference clock cycles using cycle time counter 256. At every timestamp period, target timestamp offset ($\Delta$TS) 236 and reference timestamp offset ($\Delta$TS') 238 are generated by measuring the difference between current timestamps TS 254 and TS' 257 and previous timestamps Prey TS 258 and Prey TS' 260, wherein target timestamp offsets $\Delta$TS 236 and $\Delta$TS' 238 are forwarded on to target clock generator 206 of FIG. 2A. Pace clock generator 204 may determine the fractional relationship between $\Delta$TS 236 and $\Delta$TS' 238 and pass the calculated numerator and denominator of that fraction to modular accumulator 262, which then produces mask signal 264 to generate pace clock 234 out of local reference clock 214.

Mask signal 264 may include a one-bit signal that is used for filtering the pulse of reference clock 214 to facilitate generation of pace clock 234 which has the fractional frequency relationship of $\Delta$TS 236 and $\Delta$TS' 238. For example, if $\Delta$TS 236 is 1 and $\Delta$TS' 238 is 3, mask signal 264 may go high for one reference clock cycle and stay low for two reference clock cycles. Accordingly, one pulse out of three reference clock pulses may be passed on to pace clock 234, resulting in a 3 times slower clock than reference clock 214. In order to increase the frequency accuracy of pace clock 234, a large bit-width or high resolution may be used for representing $\Delta$TS 236 and $\Delta$TS' 238. In some embodiments, such as in this case, when calculating $\Delta$TS 236 or $\Delta$TS' 238, timestamps even older or previous than Prey TS 258 or Prey TS' 260. In other words, choosing an older timestamp representing a certain time may mean that the system takes a look at two clock frequencies for a long period of time and this can enhance the accuracy of pace clock 234 by increasing the resolution of timestamps as well as averaging out any temporal timestamp glitches.

Figure 2C:
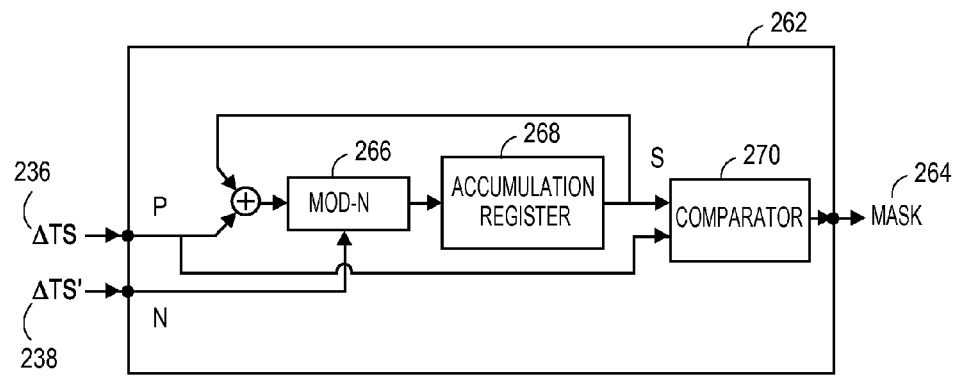
FIG. 2C illustrates modular accumulator of pace clock generator according to one embodiment.

FIG. 2C illustrates modular accumulator 262 of pace clock generator 204 according to one embodiment. In one embodiment, module accumulator 262 provides a mechanism for generating mask signals 264 as illustrated here. Modular accumulator 262 takes in ΔTS' 238 as modulus value N ("mod–N") 266, while it takes in ΔTS 236 as phase increment value P. Modular accumulator 262 has N states and represents N phase value from 0 to N, while at every cycle, it may increment accumulation register (S) 268 by phase incrementing value P and applying modular operation with value N. According to modular operation, if the sum of the accumulation register (S) value and phase increment (P) value exceeds the value N, then the new accumulation register 268 may wrap around and is updated to the sum of accumulation register value S+phase increment value P−value N. Mask signal 264 represents a one bit signal of which value is determined by comparing value S to value P. If value S is less than value P, then mask signal 264 is set to high; otherwise, the mask is set to low. Further, modular accumulator 262 may be fully implemented in digital circuits even though the resolution (bit-width) of value P and N is increased, while the just bit-width of adder and modular operator may also be increased. This means the frequency accuracy of pace clock 234 without significant hardware complexity increase.

Figure 2D:
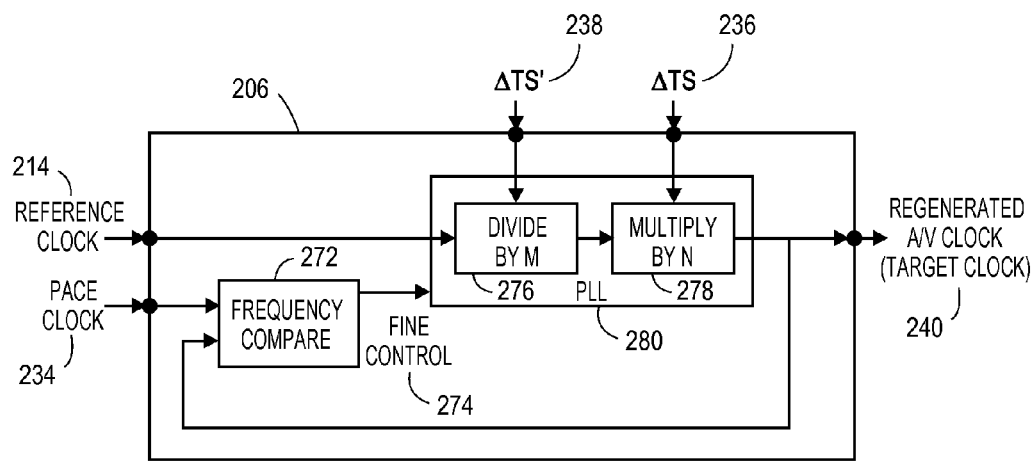
FIG. 2D illustrates a target clock generator according to one embodiment.

Now referring to FIG. 2D, it illustrates target clock generator 206 according to one embodiment. In one embodiment, target clock generator 206 is used to generate target clock 240 using, for example, PLL circuit 280. Further, to increase the clock frequency accuracy and reduce the jitter relating to the generated target clock 240, in one embodiment, a digital feedback loop is provided, via frequency compare block 272, to finely control 274 the PLL circuit 280. As illustrated, frequency compare block 272 compares the frequency of pace clock 234 and the regenerated target clock 240. If, for example, target clock 240 is slower than the pace clock 234, it accelerates PLL 280 to increase the frequency of target clock 240; otherwise, to the contrary, it decreases the frequency of target clock 240.

PLL is very complex and takes large amount of chip area to support the wide range of N and M values. The feedback control mechanism, as provided by frequency compare block 272, adjusts the regenerated target clock 240 to maintain accurate frequency even though the resolution of PLL 280 may not be enough. It is contemplated that removing this constraint may significantly reduce various factors, such as hardware complexity, cost and the amount of chip area, that are normally associated with PLL 280. For example, modular accumulator 262 may use higher resolution P value and N value than the resolution of M value and N value for PLL 280 by multiplying 278 ΔTS 236 by N value and by dividing 276 ΔTS' 238 by M value, high clock accuracy may be maintained by keeping low the hardware cost.

As aforementioned, clock generation mechanism 110 may contain other logic or components, such as communication logic facilitate communication between various media devices, such as source devices, sink devices, intermediate devices, such as analog-digital convertors, clock generators, etc., of different bands, makes, versions, mechanisms, etc. Communication logic may further provide various modules to facilitate communication between various components of clock generation mechanism 110 as well as with and through certain default communication components (such as receivers, transmitters, analog-digital convertors, audio-video convertors, processors, loud speakers, I/O components, buffers, and the like) that may be part of various media devices. Similarly, clock generation mechanism 110 may include other logic, such as compatibility logic to facilitate compatibility between media devices, such as source devices, sink devices, intermediate devices, such as analog-digital convertors, clock generators, etc., of different bands, makes, versions, mechanisms, etc., and is not limited to any particular number or type of media devices, technology, components, standards, audio/video formats, audio and video signal types, hardware, connections, software, equipment, such as displays, wires, connections, etc., or the like. It is to be noted and appreciated that any reference to a particular device, such as "television", or other similar media devices is made as an example to promote brevity, clarity and ease of understanding and that embodiments of the invention are not limited to a particular type, brand, or number of media devices and/or their components.

Figure 3:
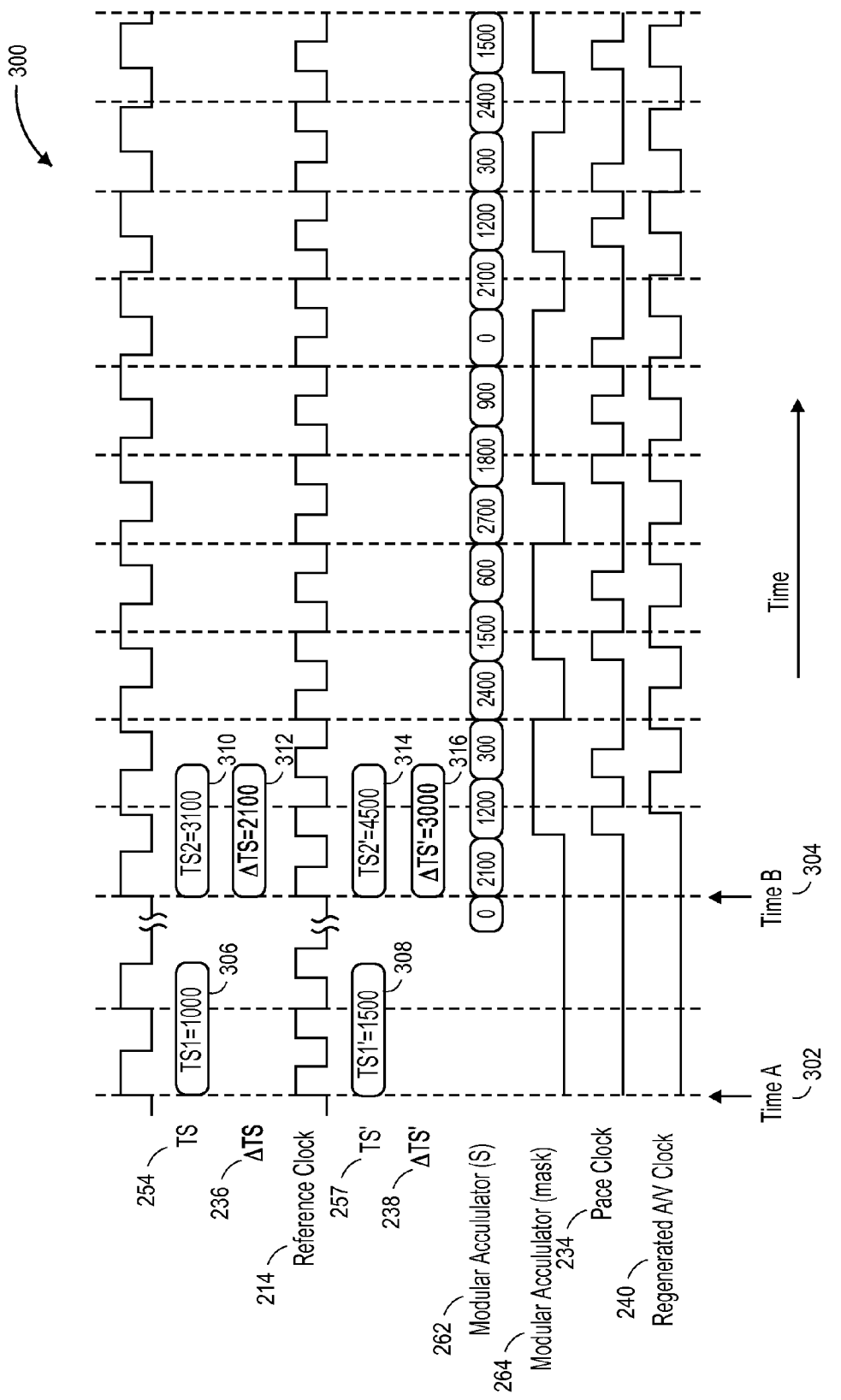
FIG. 3 illustrates a transaction sequence for dynamic timestamp-less clock generation for transmitting media streams over shared channels according to one embodiment.

FIG. 3 illustrates a transaction sequence 300 for dynamic timestamp-less clock generation for transmitting media streams over shared channels according to one embodiment. Transaction sequence 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, transaction sequence 300 is performed by dynamic timestamp-less clock generation mechanism 110 of FIG. 1.

For example and in one embodiment, as illustrated, until a certain time A 302, a source device has sent 1000 audio/video samples (TS1) 306 that are counted by a receiving sink device. The aforementioned count of 1000 A/V samples may be regarded as timestamp TS1 corresponding to timestamp, TS 254. Simultaneously, at time A 302, the sink device may capture timestamp TS1' of 1500 reference clock cycles 308, corresponding to timestamp, TS' 257, from a counter relating to a local reference clock 214.

Subsequently, at time B 304, the sink device may get another timestamp TS2 of 3100 A/V samples 310 corresponding to timestamp TS 254. At the same time B 304, the sink device may capture TS2' of 4500 reference clock cycles 314 corresponding to timestamp TS' 257. Using this simple example and its arithmetic, the sink device gets ΔTS (2100) 312 and ΔTS' (3000) 316, which reflects the ratio between the source A/V clock frequency and the sink reference clock frequency. This ratio may be applied both to PLL and the modular accumulator 262. The modular accumulator 262 accumulates ΔTS (2100) 312 at each of the reference clock cycles when the sum may be over ΔTS' (3000) 316 and then it subtracts 3000 from the sum. If the sum value is less than 2100, the mask signal 264 goes high; otherwise, it goes low. The mask signal 264 may be used to filter the reference clock and generates a pace clock 234. The relationship between the frequency of the pace clock 234 and the reference clock may be exactly the same as the ratio of ΔTS (2100) 312 and ΔTS' (3000) 316. This pace clock 234 is then used to finely control the target clock (regenerated A/V clock) 240 by simply comparing the frequency of pace clock 234 with that of target clock 240.

Figure 4:
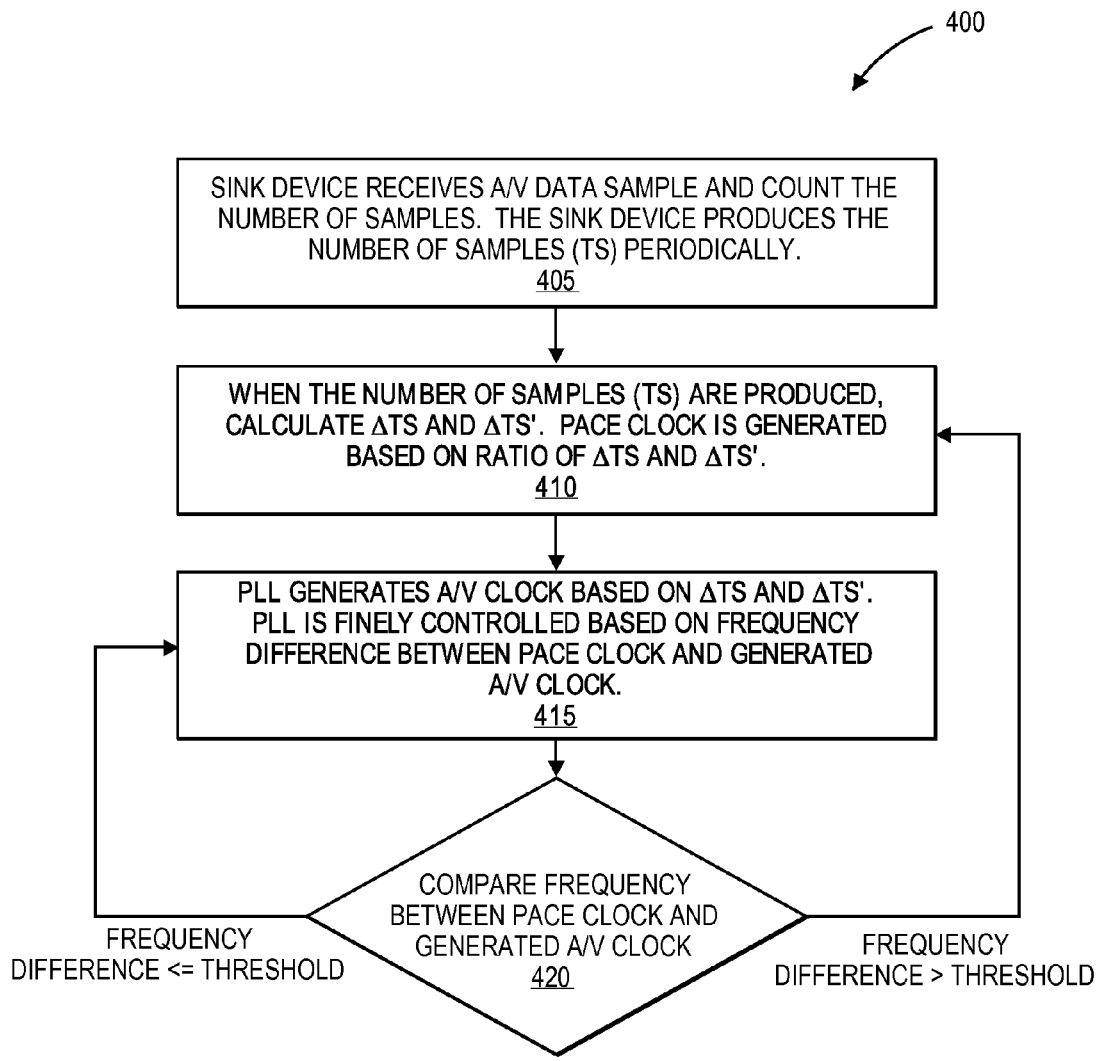
FIG. 4 illustrates a method for dynamic timestamp-less clock generation for transmitting media streams over shared channels according to one embodiment.

FIG. 4 illustrates a method 400 for dynamic timestamp-less clock generation for transmitting media streams over shared channels according to one embodiment. Method 400 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 400 is performed by dynamic timestamp-less clock generation mechanism 110 of FIG. 1.

Method 400 begins at block 405 with a sink device receiving A/V data sample and counting the number of samples to, periodically, produce a number of samples. At block 410, once the number of samples has been produced, this information is used to determine a ratio between the source A/V clock and the local reference clock (ΔTS vs. ΔTS'). In one embodiment, pace clock is generated based on the ratio of ΔTS and ΔTS'.

Once the ratio is determined in at block 410, the process moves over to block 415 with the PLL generating an A/V clock based on ΔTS and ΔTS'. Further, the PLL is finely controlled based on a frequency difference between the frequency of pace clock and that of the generated A/V clock. In other words, fine control is applied to increase the frequency accuracy and reduce any jitter relating to the target clock.

At decision block 420, a comparison of the frequencies of the pace clock and the generated A/V clock is performed to determine the frequency difference level as it compares to a predetermined threshold. If the frequency difference is determined to be greater than the user-defined threshold, it is considered as an error condition and process returns to block 410. If, however, the frequency difference is determined to be less than or equal to the threshold, minor control may be continuously applied as the process continues with block 415.

Figure 5:
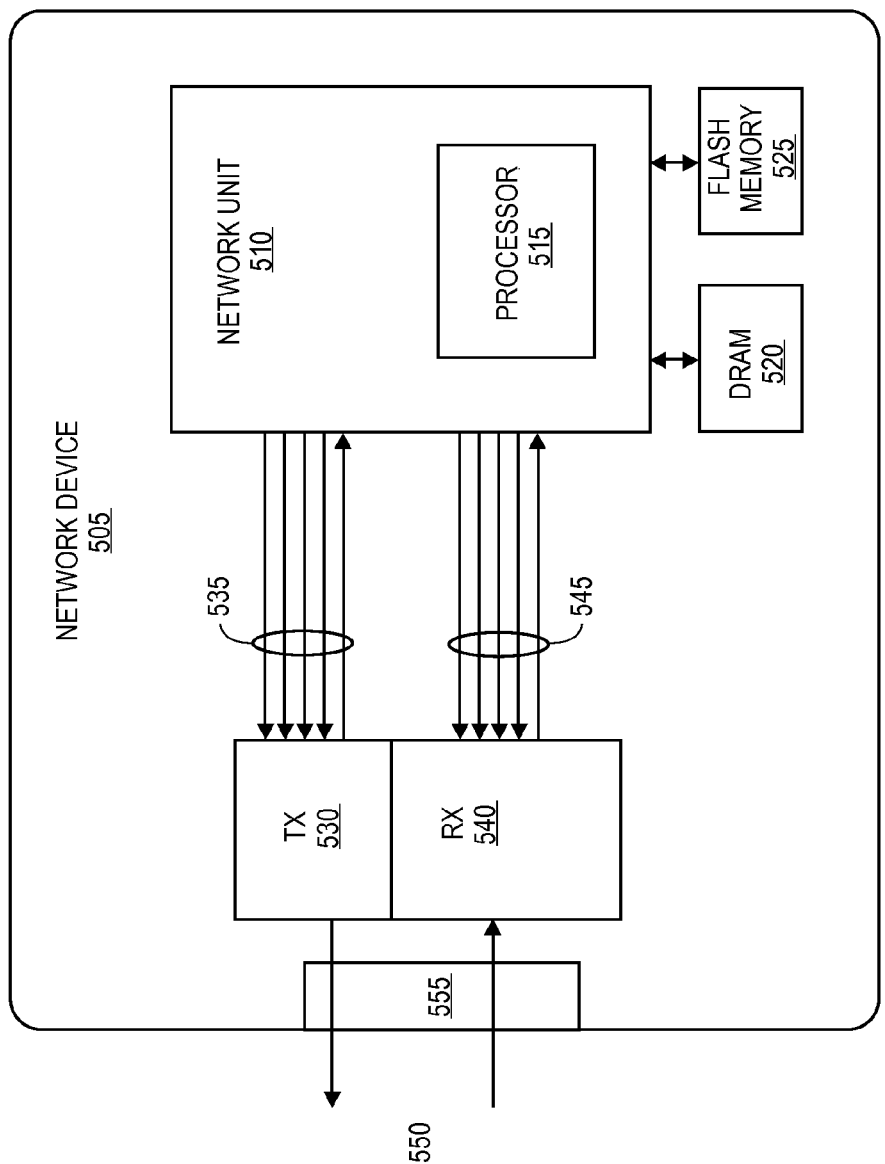
FIG. 5 illustrates a computing device capable of employing one or more embodiments.

FIG. 5 illustrates components of a network computer device 505 employing dynamic timestamp-less clock generation mechanism 110 of FIG. 1 according to one embodiment. In this illustration, a network device 505 may be any device in a network, including, but not limited to, a computing device, a network computing system, a television, a cable set-top box, a radio, a Blu-ray player, a DVD player, a CD player, an amplifier, an audio/video receiver, a smartphone, a Personal Digital Assistant (PGA), a storage unit, a game console, or other media device. In some embodiments, the network device 505 includes a network unit 510 to provide network functions. The network functions include, but are not limited to, the generation, transfer, storage, and reception of media content streams. The network unit 510 may be implemented as a single system on a chip (SoC) or as multiple components.

In some embodiments, the network unit 510 includes a processor for the processing of data. The processing of data may include the generation of media data streams, the manipulation of media data streams in transfer or storage, and the decrypting and decoding of media data streams for usage. The network device may also include memory to support network operations, such as Dynamic Random Access Memory (DRAM) 520 or other similar memory and flash memory 525 or other nonvolatile memory. Network device 505 also may include a read only memory (ROM) and or other static storage device for storing static information and instructions used by processor 515.

A data storage device, such as a magnetic disk or optical disc and its corresponding drive, may also be coupled to network device 505 for storing information and instructions. Network device 505 may also be coupled to an input/output (I/O) bus via an I/O interface. A plurality of I/O devices may be coupled to I/O bus, including a display device, an input device (e.g., an alphanumeric input device and or a cursor control device). Network device 505 may include or be coupled to a communication device for accessing other computers (servers or clients) via external data network. The communication device may comprise a modem, a network interface card, or other well-known interface device, such as those used for coupling to Ethernet, token ring, or other types of networks.

Network device 505 may also include a transmitter 530 and/or a receiver 540 for transmission of data on the network or the reception of data from the network, respectively, via one or more network interfaces 555. Network Device 505 may be the same as the communication media device 100 of FIG. 1 employing dynamic timestamp-less clock generation mechanism 110 of FIG. 1. The transmitter 530 or receiver 540 may be connected to a wired transmission cable, including, for example, a cable 550, such as an Ethernet cable including a coaxial cable, or to a wireless unit. In one embodiment and for example, Ethernet 550 may be similar to or the same as shared channel 216 of FIG. 2A. The transmitter 530 or receiver 540 may be coupled with one or more lines, such as lines 535 for data transmission and lines 545 for data reception, to the network unit 510 for data transfer and control signals. Additional connections may also be present. The network device 505 also may include numerous components for media operation of the device, which are not illustrated here.

Network device 505 may be interconnected in a client/server network system or a communication media network (such as satellite or cable broadcasting). A network may include a communication network, a telecommunication network, a Local Area Network (LAN), Wide Area Network (WAN), Metropolitan Area Network (MAN), a Personal Area Network (PAN), an intranet, the Internet, etc. It is contemplated that there may be any number of devices connected via the network. A device may transfer data streams, such as streaming media data, to other devices in the network system via a number of standard and non-standard protocols.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

One or more modules, components, or elements described throughout this document, such as the ones shown within or associated with an embodiment of a DRAM enhancement mechanism may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), EEPROM, magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
  a first media device having
  a first logic to periodically count and produce a number of audio/video ("A/V") samples;
  a second logic to generate a pace clock based on the number of A/V samples;
  a third logic to generate a target clock based on the pace clock; and
  a fourth logic to transmit an A/V media stream based on a frequency difference between a pace frequency relating to the pace clock and a target frequency relating to the target clock.

2. The apparatus of claim 1, wherein the production of the number of A/V samples is based on A/V packets received from a second media device over a network.

3. The apparatus of claim 1, wherein the frequency difference is compared to a predefined frequency threshold to determine transmission of the A/V media stream.

4. The apparatus of claim 1, further comprising a display device coupled to the first media device to display the A/V media stream.

5. The apparatus of claim 1, wherein the first media device comprises a sink device including one or more of a television, a cinema display, a projector, a Digital Versatile Disk (DVD) player, a Blu-ray player, a computing device, a smartphone, a Personal Digital Assistant (PDA), a game console, a docking station, a cable adapter, and a dongle.

6. The apparatus of claim 2, wherein the second media device comprises a source device including a network computing system, a cable set-top box, a cable headend, a satellite broadcasting system, a Blu-ray player, a DVD player, a smartphone, and a PDA.

7. The apparatus of claim 2, wherein the network comprises one or more of a broadcasting network, a Local Area Network (LAN), a Wide Area Network (WAN), a Personal Area Network (PAN), a Metropolitan Area Network (MAN), an intranet, the Internet, a cloud-based network, and a shared-channel network including a High-Definition Multimedia Interface (HDMI), a Mobile High-Definition Link (MHL), a DisplayPort, a Universal Serial Bus (USB), a Peripheral Component Interconnect (PCI), and an on-chip bus including Advanced Microcontroller Bus Architecture (AMBA).

8. A system comprising:
  a computing device having a memory to store instructions, and a processing device to execute the instructions, wherein the instructions cause the processing device to facilitate a first media device to periodically count and produce a number of audio/video ("A/V") samples;
  generate a pace clock based on the number of A/V samples;
  generate a target clock based on the pace clock; and
  transmit an A/V media stream based on a frequency difference between a pace frequency relating to the pace clock and a target frequency relating to the target clock.

9. The system of claim 8, wherein the production of the number of A/V samples is based on A/V packets received from a second media device over a network.

10. The system of claim 8, wherein the frequency difference is compared to a predefined frequency threshold to determine transmission of the A/V media stream.

11. The system of claim 8, further comprising a display device coupled to the first media device to display the A/V media stream.

12. The system of claim 8, wherein the first media device comprises a sink device including one or more of a television, a cinema display, a projector, a Digital Versatile Disk (DVD) player, a Blu-ray player, a computing device, a smartphone, a Personal Digital Assistant (PDA), a game console, a docking station, a cable adapter, and a dongle.

13. The system of claim 9, wherein the second media device comprises a source device including a network computing system, a cable set-top box, a cable headend, a satellite broadcasting system, a Blu-ray player, a DVD player, a smartphone, and a PDA.

14. The system of claim 9, wherein the network comprises one or more of a broadcasting network, a Local Area Network (LAN), a Wide Area Network (WAN), a Personal Area Network (PAN), a Metropolitan Area Network (MAN), an intranet, the Internet, a cloud-based network, and a shared-channel network including a High-Definition Multimedia Interface (HDMI), a Mobile High-Definition Link (MHL), a DisplayPort, a Universal Serial Bus (USB), a Peripheral Component Interconnect (PCI), and an on-chip bus including Advanced Microcontroller Bus Architecture (AMBA).

15. A method comprising:
   periodically counting and producing, at a first media device, a number of audio/video ("A/V") samples;
   generating a pace clock based on the number of A/V samples;
   generating a target clock based on the pace clock; and
   transmitting an A/V media stream based on a frequency difference between a pace frequency relating to the pace clock and a target frequency relating to the target clock.

16. The method of claim 15, wherein the production of the number of A/V samples is based on A/V packets received from a second media device over a network.

17. The method of claim 15, wherein the frequency difference is compared to a predefined frequency threshold to determine transmission of the A/V media stream.

18. The method of claim 15, further comprising a display device coupled to the first media device to display the A/V media stream.

19. The method of claim 15, wherein the first media device comprises a sink device including one or more of a television, a cinema display, a projector, a Digital Versatile Disk (DVD) player, a Blu-ray player, a computing device, a smartphone, a Personal Digital Assistant (PDA), a game console, a docking station, a cable adapter, and a dongle, wherein the second media device comprises a source device including a network computing system, a cable set-top box, a cable headend, a satellite broadcasting system, a Blu-ray player, a DVD player, a smartphone, and a PDA.

20. The method of claim 15, wherein the network comprises one or more of a broadcasting network, a Local Area Network (LAN), a Wide Area Network (WAN), a Personal Area Network (PAN), a Metropolitan Area Network (MAN), an intranet, the Internet, a cloud-based network, and a shared-channel network including a High-Definition Multimedia Interface (HDMI), a Mobile High-Definition Link (MHL), a DisplayPort, a Universal Serial Bus (USB), a Peripheral Component Interconnect (PCI), and an on-chip bus including Advanced Microcontroller Bus Architecture (AMBA).

* * * * *